United States Patent [19]
De Lavenne

[11] 3,885,812
[45] May 27, 1975

[54] LOCKING DEVICE IN PARTICULAR FOR A SAFETY BELT

[75] Inventor: Hubert De Lavenne, Meudon, France

[73] Assignee: Automobiles Peugeot Regie Nationale des Usines Renault, Paris, France

[22] Filed: Jan. 7, 1974

[21] Appl. No.: 431,310

[30] Foreign Application Priority Data
Jan. 26, 1973   France .............................. 73.02759

[52] U.S. Cl............. 280/150 SB; 297/388; 297/389
[51] Int. Cl. ........................................... B60r 21/02
[58] Field of Search ............ 280/150 SB; 180/82 C; 297/385, 388, 389; 24/134 N

[56] References Cited
UNITED STATES PATENTS
1,244,136   10/1917   Segerdahl ........................ 24/134 N
3,494,571   2/1970   Stoffel............................ 297/388 X
3,713,506   1/1973   Lipschutz........................ 297/388 X Primary Examiner—Philip Goodman
Assistant Examiner—Michael J. Forman
Attorney, Agent, or Firm—Burns, Doane, Swecker & Mathis

[57] ABSTRACT

The device clamps the safety belt between a fixed plate and a movable member which is connected to the plate by pivotable links which are biased by resiliently yieldable means to a position for urging the movable member against the belt. A pull on the belt which unwinds the belt from a belt winder shifts the movable member in a direction to pivot the links in such direction that they clamp the movable member still more forcefully against the belt.

9 Claims, 2 Drawing Figures

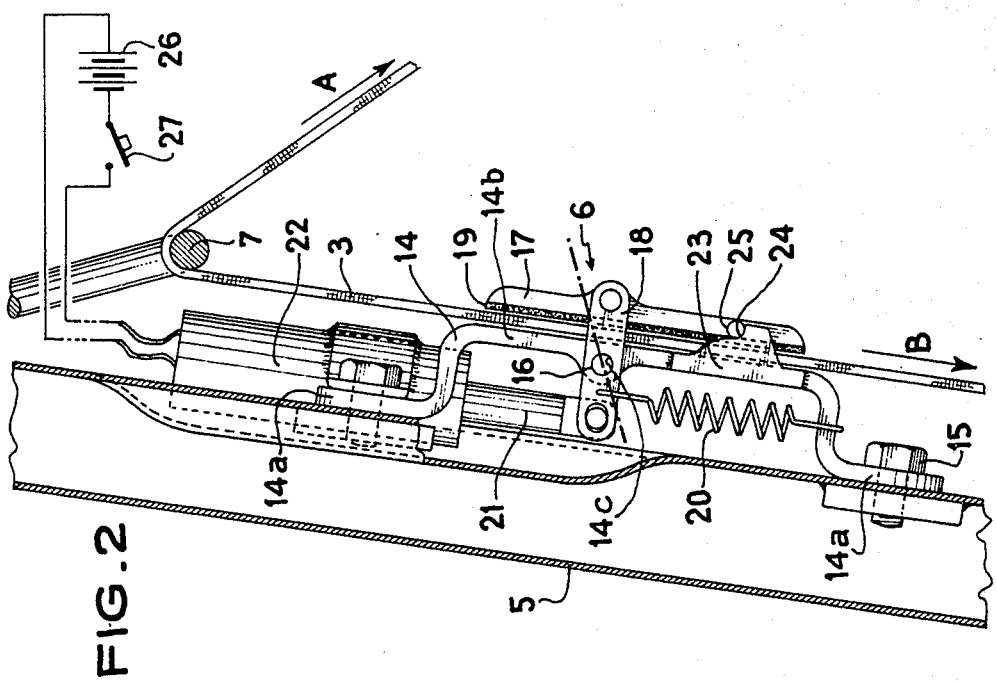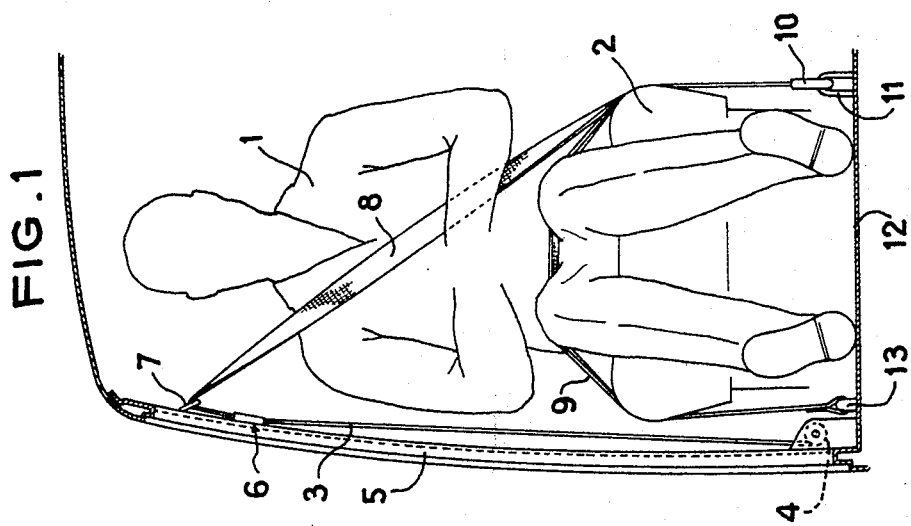

LOCKING DEVICE IN PARTICULAR FOR A SAFETY BELT

The present invention relates to a locking device for a safety belt associated with an automatic winder for retaining an occupant of a vehicle on his seat.

It is known to employ on a vehicle a safety belt or strap associated with an automatic winder in order to avoid having to regulate the length of the belt in accordance with the corpulence of the user and/or the longitudinal position of the seat. In order that the belt be able to perform its retaining function upon sudden deceleration the assembly is completed by a device for locking the belt.

These locking devices may be put into two categories: those which operate upon sudden deceleration and those which are permanently operative.

The locking devices which operate only upon sudden deceleration are usually designed to ensure a self-tightening of the belt so as to resist the considerable forces to which this belt is subjected in particular in an accident. But these devices leave the belt free to slide in the opposite direction under the action of the winder and this maintains a continuous uncomfortable pressure on the chest of the user and results in wear or shining of the clothing of the user.

The devices which act permanently to hold the belt stationary after its adjustment avoid the aforementioned drawbacks but, as they retain the belt in both directions of its movement, they are not of the self-locking type. They therefore require very powerful clamping means the action of which is never certain to be sufficient to prevent any sliding of the belt when the latter is subjected to tensile forces reaching several tons.

An object of the present invention is to provide a locking device for a belt which is particularly simple and ensures both the self-clamping of the belt when it is urged in one direction of unwinding and a sufficient clamping to prevent its winding under the action of the return spring of the winder.

The invention provides a locking device in particular for a safety belt secured at one end to a winder, the device comprising a fixed plate and a movable member defining a gap in which the belt is slidable, wherein the movable member is connected to the fixed plate by pivoted links, a resiliently yieldable means tending to clamp the movable member against the fixed plate by swinging the links in such direction that when the belt is pulled in a direction to cause the unwinding of the belt there is an increase in the clamping of the movable member against the belt and fixed plate.

According to another feature of the invention, at least the movable member is covered on the surface thereof in contact with the belt with a layer of a material having a high coefficient of friction.

In yet another feature, means are provided for manually actuating the movable member so as to move it in a direction away from the fixed plate and fully release the belt.

Advantageously, these manual actuating means comprise an electromagnet which is capable of acting in opposition to the resiliently yieldable means to place the links in a position perpendicular to the fixed plate so as to increase the gap between the fixed plate and the movable member.

Another object of the invention is to provide an arrangement of a safety belt in a vehicle provided with a locking device of the type defined hereinbefore.

Further features and advantages of the invention will be apparent from the ensuing description with reference to the accompanying drawing.

In the drawing:

FIG. 1 shows diagrammatically in its position of utilisation a safety belt including the locking device according to the invention, and FIG. 2 shows to an enlarged scale the locking device itself.

FIG. 1 shows the arrangement of a safety belt or strap employed for maintaining the passenger 1 of an automobile vehicle on his seat 2.

The safety belt comprises a first portion 3 having one end connected to a winder 4 secured to the lower part of an adjacent lateral post 5 of the vehicle. The winder comprises in the known manner a resiliently yieldable return means (not shown) adapted to exert a permanent pull on the belt 3. From the winder 4 the belt 3 extends through a locking device 6 according to the invention which is secured in position in the illustrated embodiment in the vicinity of the upper part of the post 5. It then passes around a ring 7, also secured to the post 5, before extending diagonally at 8 in front of the chest of the user 1 so as to constitute a cross-belt.

The belt also has a second portion 9 constituting a hip belt or strap which is connected at one end to the free end of the portion 8 through a buckle 10 fixing the belt to an anchoring means 11 integral with the floor 12.

The locking device 6 comprises a plate 14 having, in the chosen embodiment, a U shape including two flanges 14a by which it is secured to the post 5 by means of screws 15. The plate 14 defines a substantially flat end wall portion 14b and an aperture 14c for receiving a pin 16. The locking device further includes a movable member 17 connected to the plate 14 by a pair of links 18 which are parallel, arranged on each side of the member 17, and pivoted to the plate by the pin 16. The member 17 has the shape of a plate parallel to the wall portion 14b and carries on its inner surface facing the plate 14 a layer 19 of a material having a high coefficient of friction, for example bonded rubber. The portion 2 of the belt passes between the plate 14, the member 17 and the links 18 the dimensions of which links are such that, when they are perpendicular to the plate 14, the gap between the facing surfaces of the plate 14 and member 17 is slightly greater than the thickness of the belt 3.

Resiliently yieldable return means, here constituted by coil springs 20, are disposed between the links 18 and the plate 14. These springs tend to rotate the links 18 in the direction for clamping the belt 3 between the plate 14 and the member 17 so that if the belt tends, in unwinding, to draw along the member 17, there is an increased clamping of the belt or, in other words, a self-clamping effect.

The links 18 extend beyond their pivotal connection to the plate 14 and are also pivoted to an armature 21 of an electromagnet 22 which, when supplied with current, acts in the opposite direction to the action of the springs 20.

Lateral guides 23 secured to the plate 14 serve to guide the movement of the member 17 and co-operate by means of a shoulder 24 with pins or lugs 25 of the member 17 so as to limit the travel of the member when it is subjected to the action of the electromagnet 22.

The latter can be supplied with current by a source 26, constituted by the battery of the vehicle, through a switch 27 only the open position of which is stable.

The arrangement just described operates in the following manner:

To adjust the belt, it is sufficient to close the switch 27. The electromagnet 22 attracts the armature 21 and the links 18 occupy a position in which they are roughly perpendicular to the plate 14, since the displacement of the member 17 is limited by the pins 25 and the shoulder 24 of the guide 23 (position shown in FIG. 2). The gap between the plate 14 and the member 17 is then maximum and allows the belt 3 to slide freely therein.

When the belt has been adjusted, the switch 27 is released and, as the electromagnet 23 is no longer supplied with current, the links 18 driven by the spring 20 assume the orientation indicated in dot-dash line in FIG. 2 in which the member 17 clamps the belt 3 against the plate 14.

Owing to the attraction exerted by the springs 20, the device is perfectly stable and effective to oppose the displacement of the belt 3 in the direction of arrow B under the action of the winder 4.

Upon a violent impact or a sudden braking, the passenger tends to be projected forwardly and there is a strong pull on the belt 3 in the direction of arrow A. However, owing to the pre-clamping afforded by the springs 20 and the high coefficient of friction between the belt 3 and the member 17, any tendency on the part of the belt 3 to move increases the clamping and there is obtained a particularly effective locking.

To stow away the belt, it is sufficient, after having released the buckle 10 from the anchoring means 11, to depress the switch 27. The belt 3 can then slide freely through the locking device and it is normally taken up by the winder 4.

It can be seen that by extremely simple means the object of the invention is achieved with perfect reliability in operation.

Further, the greater the force exerted by the springs 20 the greater the possibility of increasing the tensile force on the belt 3 in the direction of arrow B without producing sliding. Thus, it is possible to provide, without resulting in a hindrance to the passenger, belt winders which are more powerful than those conventionally employed which are often insufficient to completely return the belt, above all after a certain period of service.

The device is always able to ensure, when required, an immediate locking of the belt with no intervention of any actuating means adapted to initiate the clamping.

The device would also operate if the fixed plate 14 were covered with a layer of a material having a high coefficient of friction, but experience has shown that in this case it will be more difficult to achieve the unlocking, for example after a sudden braking, since the electromagnet exerts insufficient force to achieve this.

The locking of the belt occurs in the region of the upper end of the diagonal portion 8 and in this way there is avoided delay in the locking which otherwise occurs when the locking is on the shaft of the winder, which delays are due to the tightening of the slack of the portion of the belt wound on the shaft of the winder and to the elastic elongation of the vertical portion of the belt extending between the winder 4 and the ring 7.

It must be understood that the invention is not intended to be limited to the illustrated embodiment. For example the same results could be obtained if the springs 20 and/or electromagnet 22 acted on the member 17 instead of the links 18. Moreover, in simpler arrangements the electromagnet could be dispensed with and replaced by manually controlled mechanical actuating means.

Having now described my invention what I claim as new and desire to secure by Letters Patent is:

1. A locking device in particular for a safety belt secured at one end to a winder, the device comprising a fixed plate and a movable member defining a gap for the belt, links pivoted to the plate and to the movable member interconnecting the plate and movable member, the links being movable between a first position in which the movable member is in a position relative to the plate to allow the belt to move freely and a second position in which the gap between the movable member and plate is less than the thickness of the belt, resiliently yieldable means co-operative with the links and biasing the links toward said second position thereof, movement of the links from said first position toward said second position being in such direction that when the belt is pulled in a direction to cause the unwinding of the belt there is an increase in the clamping of the movable member against the belt and fixed plate, and actuating means for shifting the movable member away from the fixed plate and thereby releasing the belt, said actuating means comprising an electromagnet having a moving armature, an electric circuit controlling the electromagnet, means connecting the armature to the links, the armature being adapted to act on the links in opposition to the action of the resiliently yieldable means.

2. A device as claimed in claim 1, wherein the movable member carries a layer of a material having a high coefficient of friction through which layer the movable member exerts its clamping action on the belt.

3. A device as claimed in claim 1, wherein the resiliently yieldable means comprise a spring having one end connected to the plate and another end connected to one of the links.

4. A device as claimed in claim 1, comprising a first abutment integral with the fixed plate and a second abutment which is integral with the movable member and is co-operative with the first abutment for defining an end of-travel position of the movable member in a direction away from the plate.

5. A device as claimed in claim 1, wherein the fixed plate has a U shape with end flanges and defines a substantially rectangular surface for contacting the belt, the movable member being a plate also having a substantially rectangular shape.

6. A device as claimed in claim 1, wherein the fixed plate comprises means for laterally guiding the movable member.

7. A device as claimed in claim 6, wherein the guide means caarry a first abutment, and a second abutment is integral with the movable member and is co-operative with the first abutment for defining an end-of-travel position of the movable member in a direction away from the plate.

8. A structure comprising, in a vehicle: a safety belt having a first portion connected to a belt winder and a second portion connected to means for hooking the belt to a fixed part of the vehicle, and a belt locking device fixed to the vehicle and combined with the belt in a position intermediate said first and second portions, said device comprising a fixed plate and a movable member defining a gap for the belt, links pivoted to the plate and to the movable member interconnecting the plate and movable member, the links being movable between a first position in which the movable member is in a position relative to the plate to allow the belt to move freely and a second position in which the gap between the movable member and plate is less than the thickness of the belt, resiliently yieldable means cooperative with the links and biasing the links toward said second position thereof, movement of the links from said first position toward said second position being in such direction that when the belt is pulled in a direction to cause the unwinding of the belt there is an increase in the clamping of the movable member against the belt and fixed plate.

9. A structure as claimed in claim 8, wherein the winder is located in a lower part of a post of the vehicle whereas the locking device is located in the vicinity of an upper part of the post, the belt extending through guide means disposed above the locking device.

* * * * *